United States Patent [19]

Alden

[11] Patent Number: 5,223,290
[45] Date of Patent: Jun. 29, 1993

[54] METHOD FOR COOKING FOOD IN AN INFRA-RED CONVEYOR OVEN

[75] Inventor: Lorne B. Alden, Shelburne, Vt.

[73] Assignee: G. S. Blodgett Corporation, Burlington, Vt.

[21] Appl. No.: 943,143

[22] Filed: Sep. 10, 1992

Related U.S. Application Data

[63] Continuation of Ser. No. 744,166, Aug. 13, 1991, abandoned.

[51] Int. Cl.5 .............................................. A23L 1/00
[52] U.S. Cl. .................................... 426/243; 99/386; 99/443 C; 99/451; 426/523
[58] Field of Search .............. 426/243, 523; 99/451, 99/386, 443 C; 219/388

[56] References Cited

U.S. PATENT DOCUMENTS

| | | | |
|---|---|---|---|
| 1,517,271 | 12/1924 | Woodson | 219/388 |
| 1,656,709 | 1/1928 | Kelly | 219/388 |
| 3,809,859 | 5/1974 | Wells | 219/345 |
| 4,244,285 | 1/1981 | Baker | 219/388 |
| 4,245,613 | 1/1981 | Wells et al. | 219/388 |
| 4,246,834 | 1/1981 | Brown | 219/388 |
| 4,363,955 | 12/1982 | Gauthier et al. | 219/388 |
| 4,554,437 | 11/1985 | Wagner et al. | 219/388 |
| 4,565,917 | 1/1986 | Furtek | 219/388 |
| 4,605,161 | 8/1986 | Motomiya | 219/388 |
| 4,615,014 | 9/1986 | Gigandet et al. | 219/388 |
| 4,616,123 | 10/1986 | Zagoroff | 219/388 |
| 4,716,820 | 1/1988 | Stuck | 99/443 C |
| 4,945,212 | 7/1990 | Gogan | 219/388 |
| 4,960,977 | 10/1990 | Alden | 219/388 |
| 4,964,392 | 10/1990 | Bruno et al. | 99/443 C |

*Primary Examiner*—George Yeung
*Attorney, Agent, or Firm*—Lowe, Price, LeBlanc & Becker

[57] ABSTRACT

A conveyor oven for cooking food products using infra-red radiation is described. The oven uses upper and lower etched foil heaters which are disposed above and below the upper flight of a conveyor belt passing therethrough. The oven also includes a controller for governing the speed of the belt, the time of exposure to infra-red radiation, and a range of radiation wavelength between about 4 and 5 microns for cooking the food in the oven.

8 Claims, 9 Drawing Sheets

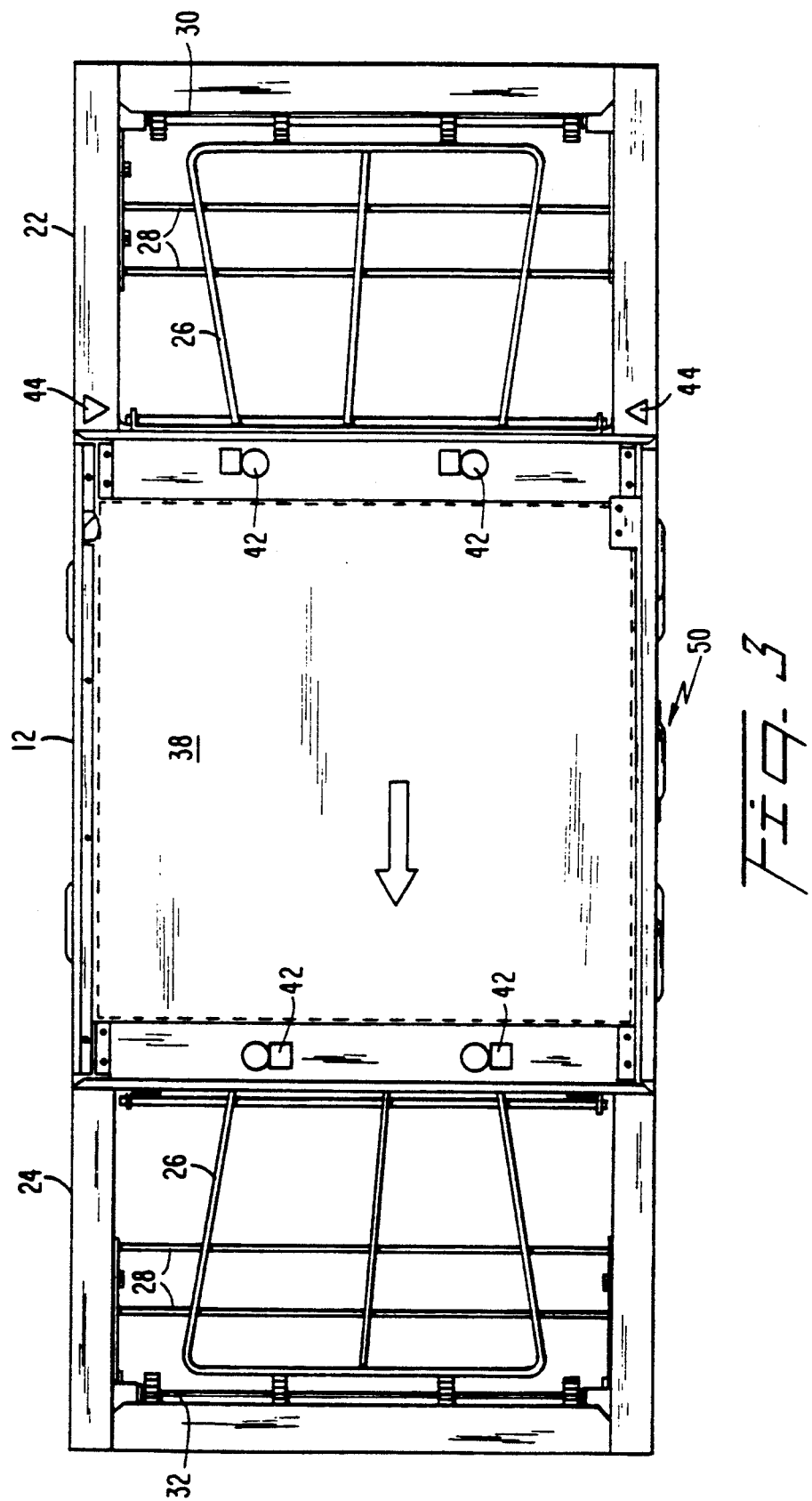

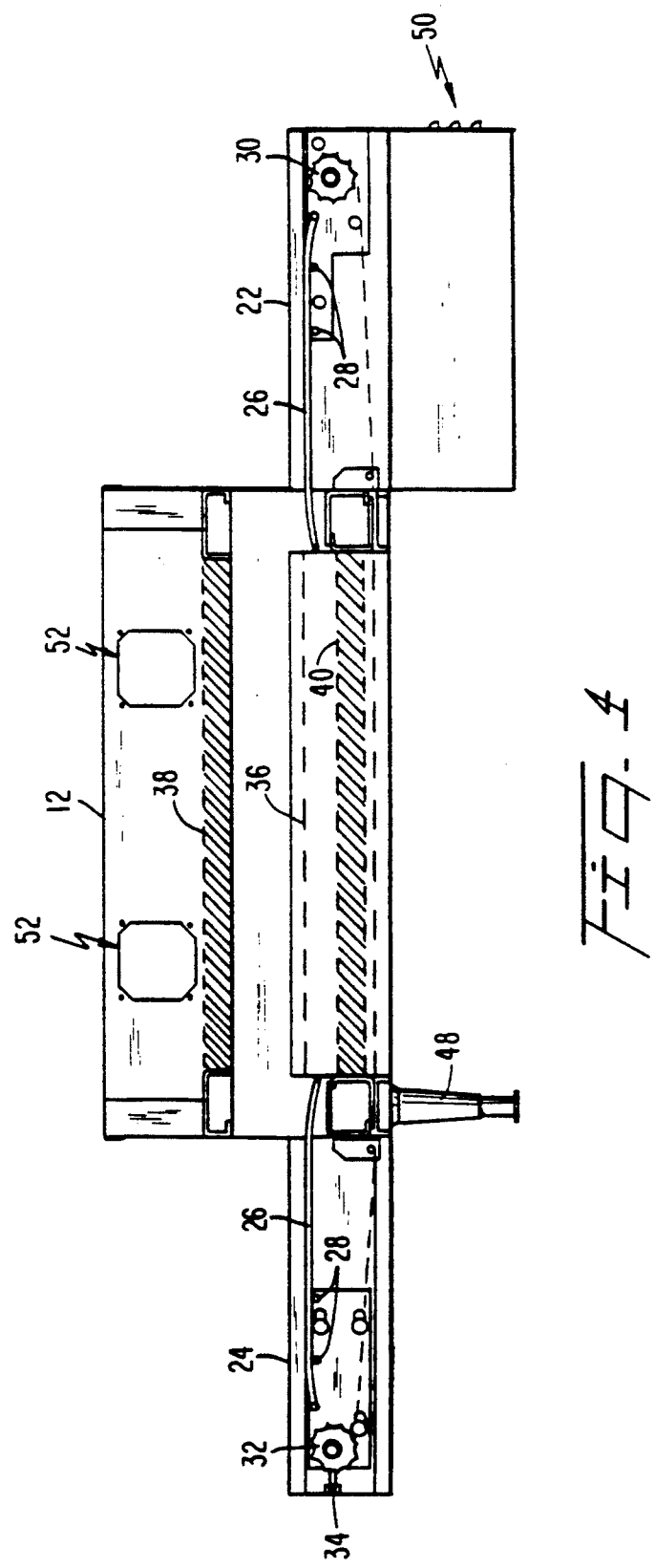

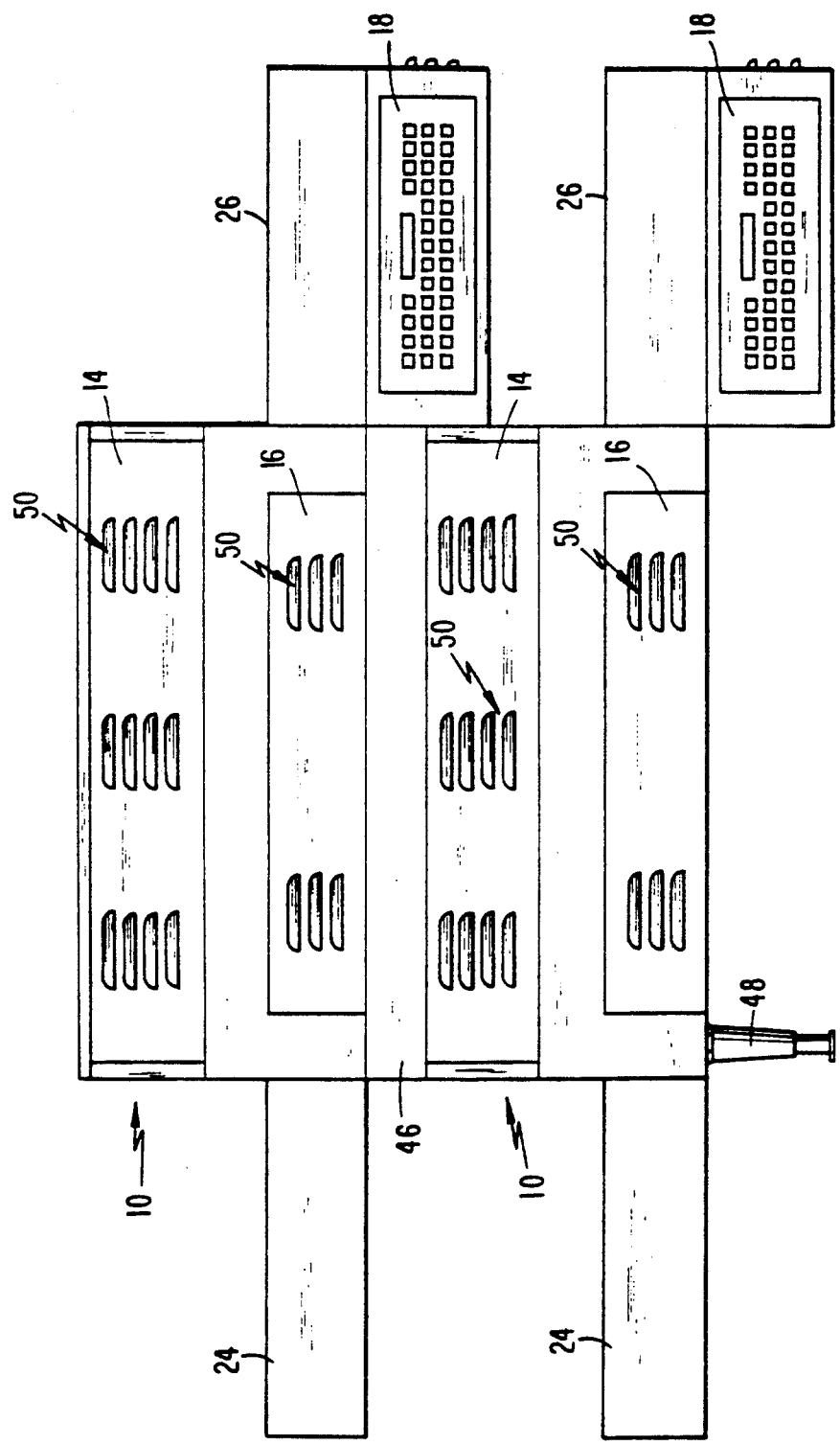

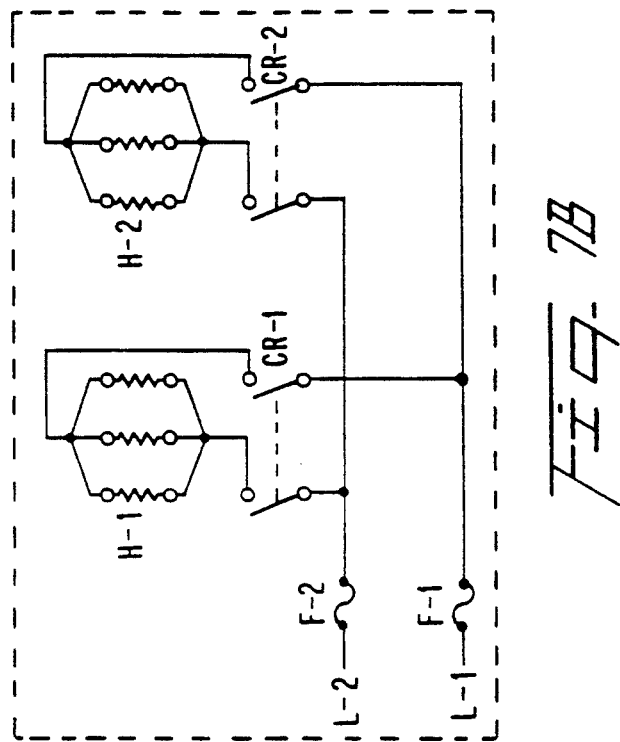
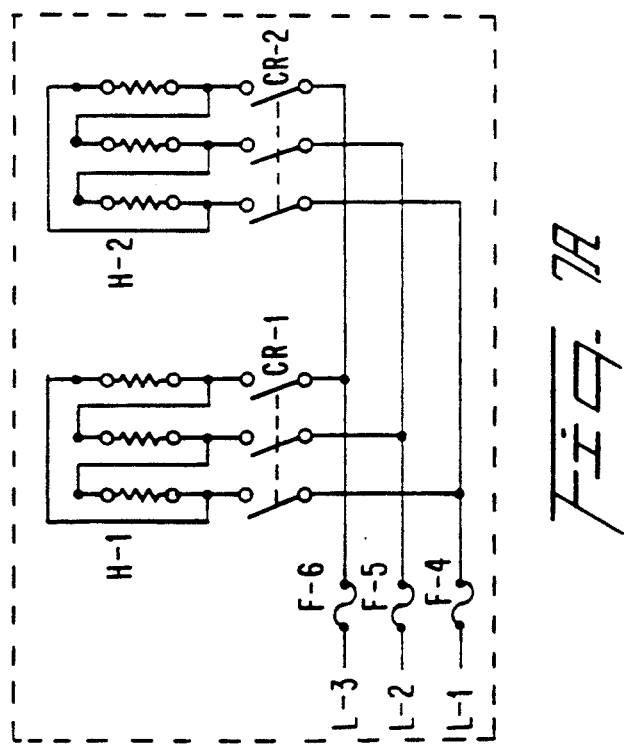
Fig. 7B
Fig. 7A

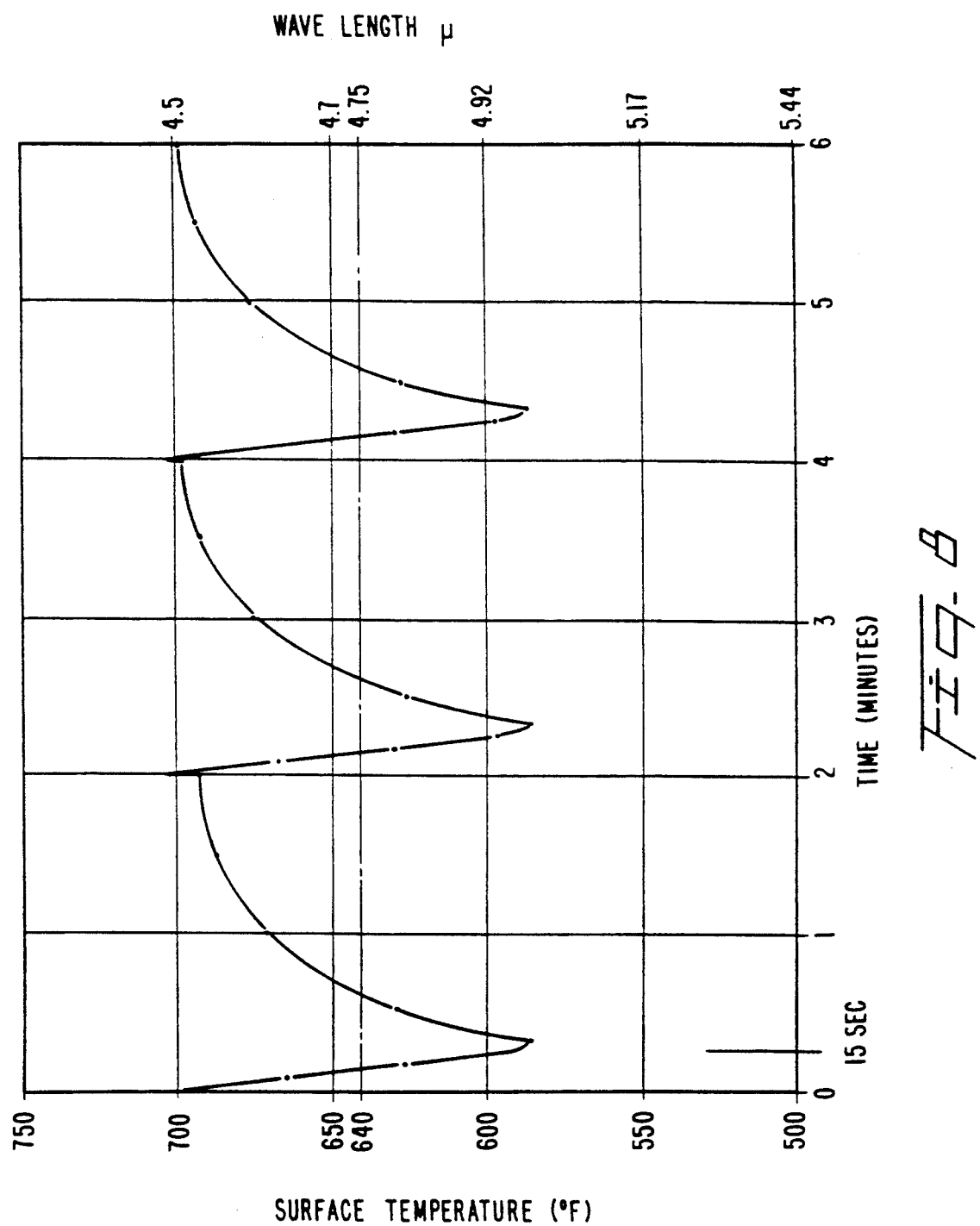

METHOD FOR COOKING FOOD IN AN INFRA-RED CONVEYOR OVEN

This application is a continuation of application Ser. No. 07/744,166 filed Aug. 13, 1991, now abandoned.

FIELD OF THE INVENTION

This invention relates to infra-red ovens and primarily to commercial ovens which are compact in design and intended for rapid cooking of a variety of different food items.

BACKGROUND OF THE INVENTION

In smaller commercial establishments, it is often desirable to provide food warmers for the display of food whereby individual orders may be placed for specific items displayed. It has now become feasible to cook food items to order in such establishments utilizing infra-red energy.

Infra-red energy is particularly suited for smaller commercial establishments because the energy produced is directional and production does not require heated air currents which may be released into the ambient atmosphere as with convection ovens and the like. While microwave ovens are also useful in such establishments, microwave ovens have distinct disadvantages relative to the inability to brown bread or rolls and to char the exterior while cooking meat. Microwave ovens, however, are compact and suitable for countertop use.

In U.S. Pat. No. 4,960,977, assigned to the assignee of this invention, there was described a countertop-type infra-red radiation oven useful, for example, to cook pizza wherein the article to be cooked was disposed upon a mesh turntable. Infra-red emitters were disposed below and above the item to be cooked and on two of its four sides. Accordingly, as the turntable rotated, all sides of the food product were exposed to radiation for cooking.

In the case of pizza, the sides, bottom, and top all may have different cooking requirements. In the above-identified infra-red oven, the emitters were separately controlled. In addition, the top emitter was disposed in a movable shroud which could be adjusted in height over the turntable as desired. Shielding for the oven was not necessary because convection currents were not involved in the cooking process and only the directional radiation of the emitters used.

This type of oven was particularly suited to the use of etched foil emitters as contrasted to the use of conventional quartz tubes, nichrome wire and the like. The foil emitters use a relatively low wattage, have a rapid warm-up and cool-down, and can be adjusted to the desired medium range wavelength of cooking energy. In addition, a ceramic or other type shield is not necessary.

In certain infra-red emitters such as that described in U.S. Pat. No. 3,809,859, a refractory cover is provided over the wire heating elements, which cover then is the source of infra-red energy to the product to be cooked. This type of device then utilizes energy both to heat the refractory material and to then generate sufficient energy to direct the same onto the product to be cooked.

It is also known to provide conveyor ovens which utilize infra-red energy. Such devices are described, for example, in U.S. Pat. Nos. 4,245,613; 4,554,437; and 4,615,014. Such ovens are normally multi-zone type ovens and large type installations. In addition, as described in U.S. Pat. No. 4,363,955, conventional thinking used shortwave energy for food cooking such as infra-red energy in the wavelength of 1-2 microns as the preferred energy for cooking. In that latter identified patent, the conveyor oven utilized was intended to brown rolls previously partially cooked. To this end, infra-red radiating tubes were provided across the path of travel of a conveyor carrying the individual rolls with a plurality of tubes at the entrance emitting medium range microwaves, but the tubes interior to the conveyor or tunnel oven both above and below were short wavelength emitters.

As described in the above-identified patent, U.S. Pat. No. 4,960,977, it has been discovered that medium wavelength infra-red radiation is vastly desirable for cooking food as compared to the short range spectrum of 1.0 to 2.5 microns. In this way, the cooking can occur at wavelengths in excess of that absorbed by water of up to about, for example, 4.20 to 4.90 microns or higher.

SUMMARY OF THE INVENTION

It has been discovered that a lightweight and efficient conveyor or tunnel oven can be provided which is sufficiently compact to mount on a countertop. The oven of this invention is also sufficiently versatile to cook a wide variety of foods including pizza, fish products, chicken products, and bakery products.

The device of this invention utilizes a mesh conveyor belt which is preferably 18 inches wide and extends through a heating chamber. The chamber mounts, above and below the belt, upper and lower heating elements which are etched foil heaters. The heaters are disposed sufficiently close to the food items to effect rapid and efficient cooking. The heaters, however, are separately controlled. While these heating elements normally disperse infra-red radiation at a wavelength of about 3 to 6 microns, the wavelength desired can be provided by altering the resistance on the heating element as is well known to those skilled in the art. Accordingly, the etched foil heaters of this invention provide a controlled cooking environment in a predetermined wavelength range utilizing heaters which minimize the wattage required. Etched foil heaters have a watt density of about 7-8 watts per square inch which is much lower than quartz tube heaters or similar types of heaters commonly used in cooking environments.

The lower heater in the preferred embodiment is spaced only about 1.5 inches below the conveyor belt, and the upper heater is spaced about 3-4 inches above the conveyor belt.

In a preferred embodiment, the oven of this invention is only 16⅝ inches high, 23 inches deep, and provides an opening for the conveyor belt at either side thereof which measures 31/16 inch high by a 1917/16 inches long. These latter dimensions are the food product clearance entering the device.

It has further been discovered that alternate embodiments of the device of this invention can be provided. In one embodiment, the conveyor belt feed is continuous through the oven. In an alternate embodiment, the conveyor belt is controlled so that it operates to move the product into the heating area, hold the product therein for a predetermined period of time, and then move the product out so that the procedure is a go-stop-go procedure. In both instances, electronic controllers are preferred which control based on time only.

Etched foil heaters have the characteristics of rapid heating and cooling. To accommodate this characteristic, a timed cycling power input is utilized in the preferred embodiment. For example, full power input may be interrupted for a period of 5-15 seconds and then reinitiated for 60-120 seconds. Also, a means to determine if there is no cooking demand for a cooking cycle for a period of, for example, five minutes, a sensor could turn the power to the unit off.

In addition, a means for determining the position of a food product may be incorporated by an electro-optical control. This device then could be used to ensure that the food product is positioned properly between both the top and lower heaters. In this way, use of the heating elements can be controlled to maximize cooking efficiency at a minimum of power required.

Accordingly, it is an object of this invention to provide a compact conveyor oven which may be utilized on, for example, a countertop and which utilizes etched foil infra-red elements as heat sources for rapid and efficient cooking.

It is another object of this invention to provide alternative embodiments of a compact conveyor oven which either operate continuously or operate on an indexing go-stop-go procedure for cooking a wide variety of food products from pizza to fish and fowl products or bakery products.

It is yet another object of this invention to provide a compact conveyor oven having a controller controlling the heat requirements therein by controlling the power input to upper and to lower heating elements, separately, wherein the heating elements are etched foil elements to minimize the wattage requirement.

These and other objects will become readily apparent with reference to the drawings and following description wherein:

BRIEF DESCRIPTION OF DRAWINGS

FIG. 3 is a top view of the oven of this invention.

FIG. 4 is a side view of the oven of this invention showing the two heating elements.

FIG. 5 is an alternative embodiment of this invention involving stacked ovens.

FIG. 7A is a schematic showing the control circuits for the heating elements in a three-phase element hookup.

FIG. 7B is a view similar to FIG. 7a showing the circuit for a single-phase element hookup.

FIG. 8 is a graph showing a typical fluctuation in the surface temperature and wavelength over time for a heating circuit in a device of this invention.

DETAILED DESCRIPTION OF THE INVENTION

Figure 1:
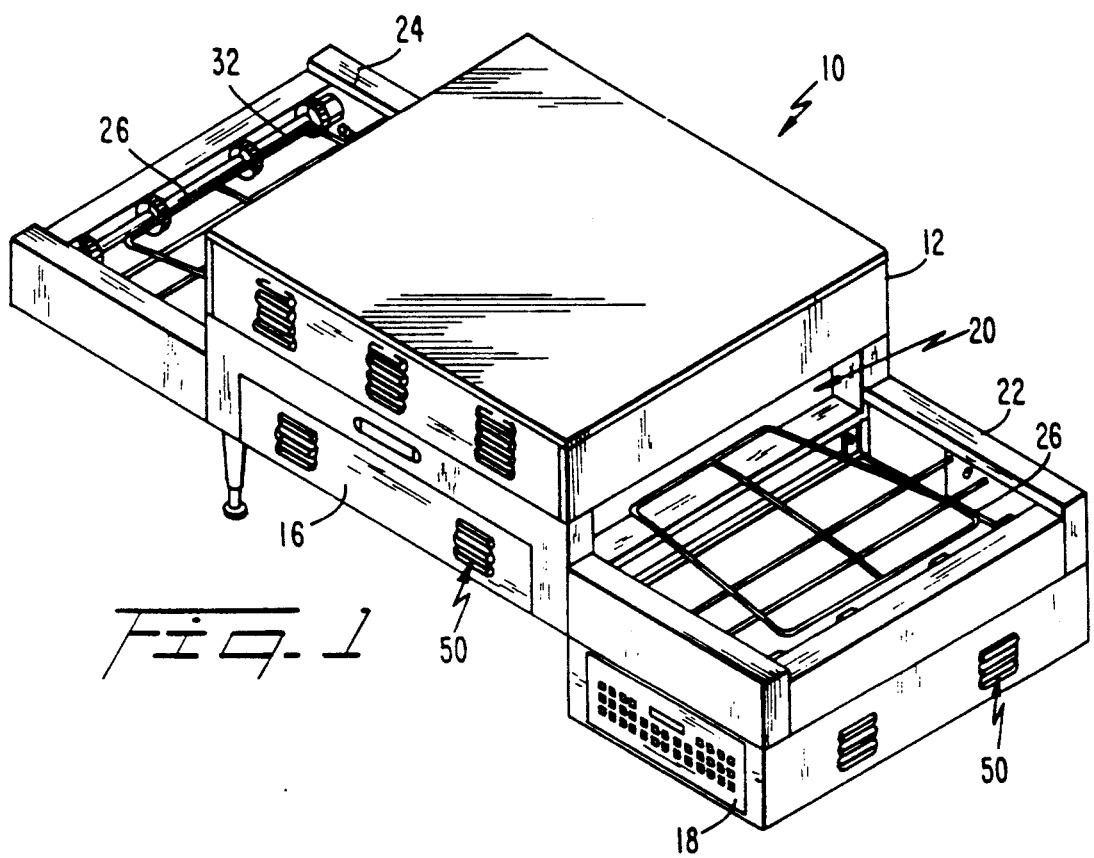
FIG. 1 is a perspective view of an embodiment of the oven of this invention.
Figure 2:
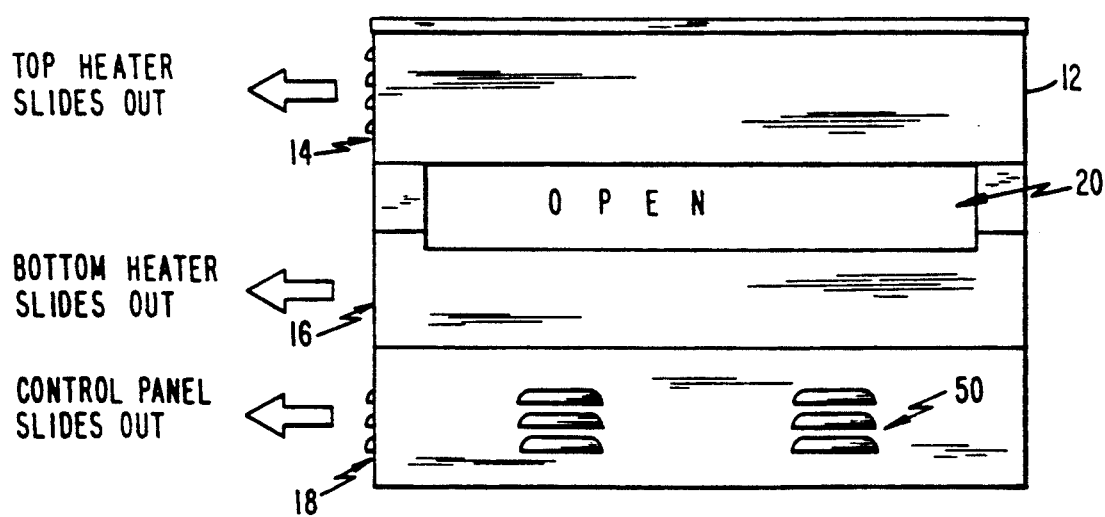
FIG. 2 is a side view thereof.

With attention to the drawings and to FIGS. 1-3, in particular, the device of this invention 10 in its preferred construction is modular. Accordingly, a housing 12 preferably mounts a top heater module 14, a bottom heater module 16, and a control panel 18. Both modules and the control panel preferably are slidably mounted within the housing 12 and, therefore, can be easily removed for cleaning, testing, or repair. As shown in FIG. 2, the housing has an opening 20 for a conveyor belt (not shown) to carry food through the housing 12. In the preferred embodiment of this invention, the opening 20 is 1/16 inches by 197/16 inches in diameter. This has been found to be adequate for most food products. In addition, the overall housing depth is preferred to be 23 inches with the height 16⅜ inches, the dimensions shown of the embodiment in the view of FIG. 2. This unit then will accommodate a conveyor belt with a width of 18 inches, and meets a desired specification that it be no more than 24 inches deep. It then can be comfortably mounted on a restaurant counter, or food processing area, or similar location. The housing 12 includes lateral extensions 22 and 24 for supporting the conveyor belt. A conveyor belt support frame member 26 is mounted in each lateral extension 22 and 24 for supporting the conveyor belt (not shown). Lateral support members 28 are provided for this purpose.

The upstream lateral support 22 further mounts a conveyor belt sprocket drive shaft 30 for the conveyor belt and a similar shaft 32 is provided downstream at extension 24. A conventional thumbscrew-type tensioning means 34 is provided on sprocket 32 to regulate the tension in the belt. With attention to FIG. 4, the conveyor belt 36 is shown in phantom therein.

Top and bottom heating elements respectively 38 and 40 are provided in housing 12 above and below the upper flight of the conveyor belt 36. These elements are preferably etched foil heaters obtainable, for example, from Thermal Circuits, Inc., of Salem, Mass. The heaters typically operate in the 3-6 micron wavelength range for optimum cooking and have a watt density of about 7-8 watts per square inch. This is a much lower watt density than quartz tube heaters that radiate in a wide wavelength range. As noted above, the wavelength can be further defined by adding resistance as would be obvious to those skilled in the art. As will be subsequently described, each heating element 38 and 40 will be separately controlled.

With attention to FIG. 3, there is also provided an illumination means for interior lighting at four locations 42 at, respectively, the entrances and exits to the housing 12 upstream and downstream of the cooking area.

In addition, an optical indicator 44 may be provided upstream of the housing 12 whereby when the cooking cycle for one food item has been completed and another food item is not entering the housing 12, the indicators 44 will so advise the controller, and the controller in turn will shut down the heating elements 38 and 40. Electro-optical controllers are available, for example, from Microswitch Division of Honeywell, Inc., Freeport, Illinois.

The control panel 18, is part of a control module (not shown) which rests upon a tray behind the control panel 18. The controller contains, as will be obvious to those skilled in the art, all major oven control elements. Electronically programmable controls suitable for use in this invention can be obtained from United Electric Controls, Inc. of Watertown, Maine or conventional controllers, as will be obvious to those skilled in the art, may be used to control belt speed, top heat and bottom heat. In the preferred embodiment, the control is by time only rather than temperature.

With attention to FIG. 5, by using a mounting collar 46, a plurality of units 10 can be stacked as desired. The collar 46 is merely a conventional flange-type collar adapted to rest on the upper surface of housing 12 and receive the lower surface of the next higher unit to be stacked. Obviously, the support legs 48 will be removed from the stacked units.

As also shown in the Figures, the housing 12 provided a plurality of vents 50. Internal fans may be provided as desired. In the preferred embodiment, with reference to FIG. 4, ventilation fans 52 shown schematically are provided above the heating element 38.

The device of this invention then is a compact conveyor oven which utilizes upper and lower heating elements which are etched foil heaters. The top heater 38 is disposed about 3-4 inches above the upper flight of the conveyor belt, and the lower heater 40 is disposed below the upper flight of the conveyor belt, a distance of about 1½ inches. The interior of housing 12 is further constructed of aluminum coating steel to reflect the infra-red radiation generated.

Figure 9:
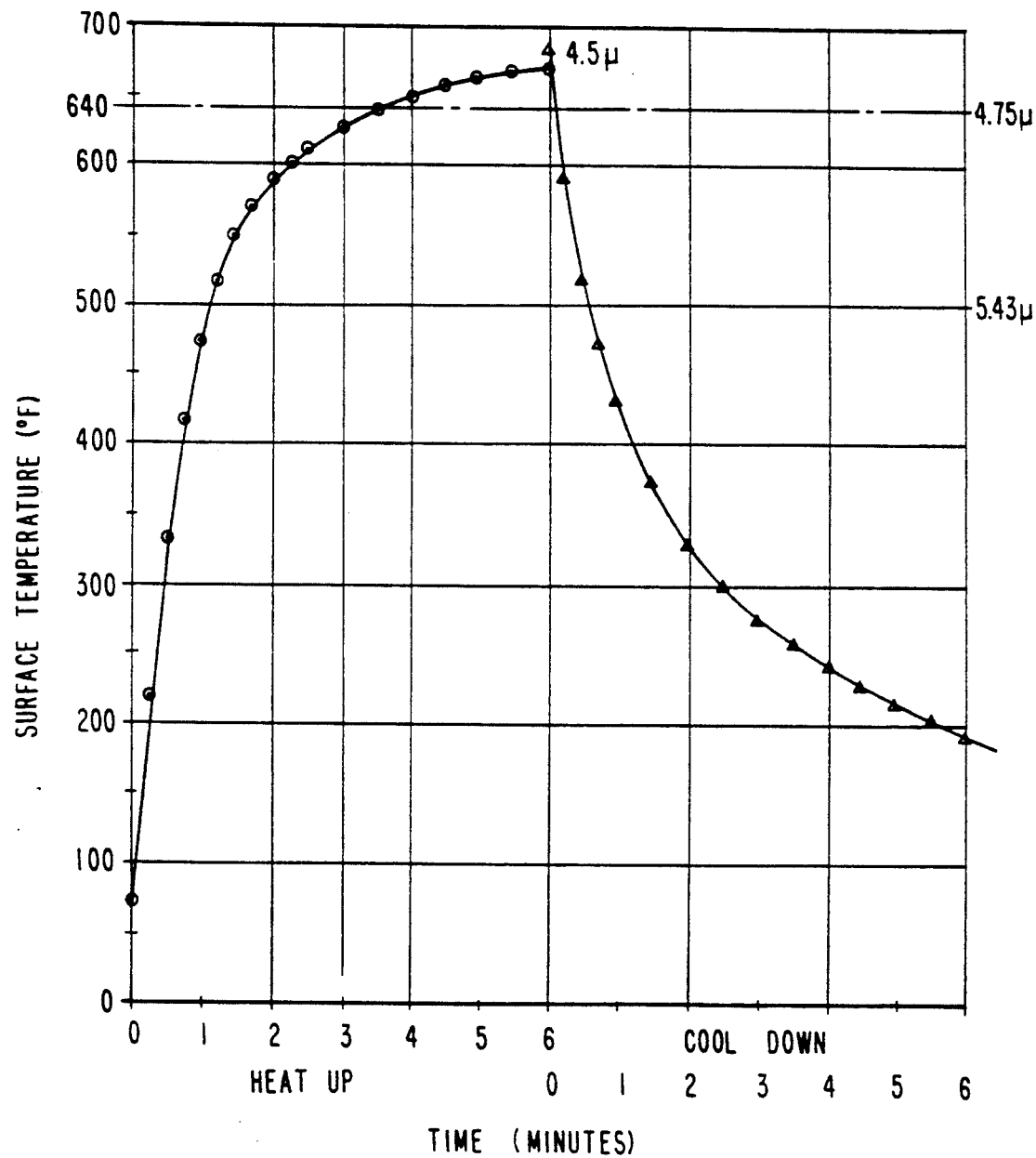
FIG. 9 is a graph depicting surface temperature against time illustrating a typical heat up and cool down mode of operation of the device of this invention.

As shown in FIG. 9, etched foil heaters inherently achieve a very rapid change in temperature, both in the heating up phase, and in cool down. As shown in FIG. 9, the heat up phase of about six minutes is satisfactory to produce a temperature above 640 degrees and a wavelength of about 4.5. Cool down occurs similarly rapidly. Accordingly, it may be desirable to provide an interrupted power input whereby for a period of 5 to 15 seconds, power is cut off, and reinitiated for 60 to 120 seconds. For example, in FIG. 8, the result causes a fluctuating wavelength of from about 4.5 up to about 5 microns and a temperature variation of about 580 to about 700 degrees. The controller above-identified can be so programmed if desired.

It has been discovered as noted above, that a cooking wavelength 4-5 microns is optimal as compared to short wavelengths in the 1-2 micron range. It is intended, within the scope of this invention, to encompass any conventional controller for regulating the generated heat to a wavelength within the desired range.

With attention to FIGS. 7A and 7B, there are depicted therein a schematic in a preferred version of the heater element hookup of the device of this invention. These schematics are intended to be illustrative, however, and not limitative. FIG. 7A is a three-phase element hookup while FIG. 7B is a single-phase element hookup. H-1, signifies the schematic for the top heater 38 and H-2 similarly identifies the lower heater 40. The separate controllers, CR-1 and CR-2 are reflected in the panel 18.

Figure 6A:
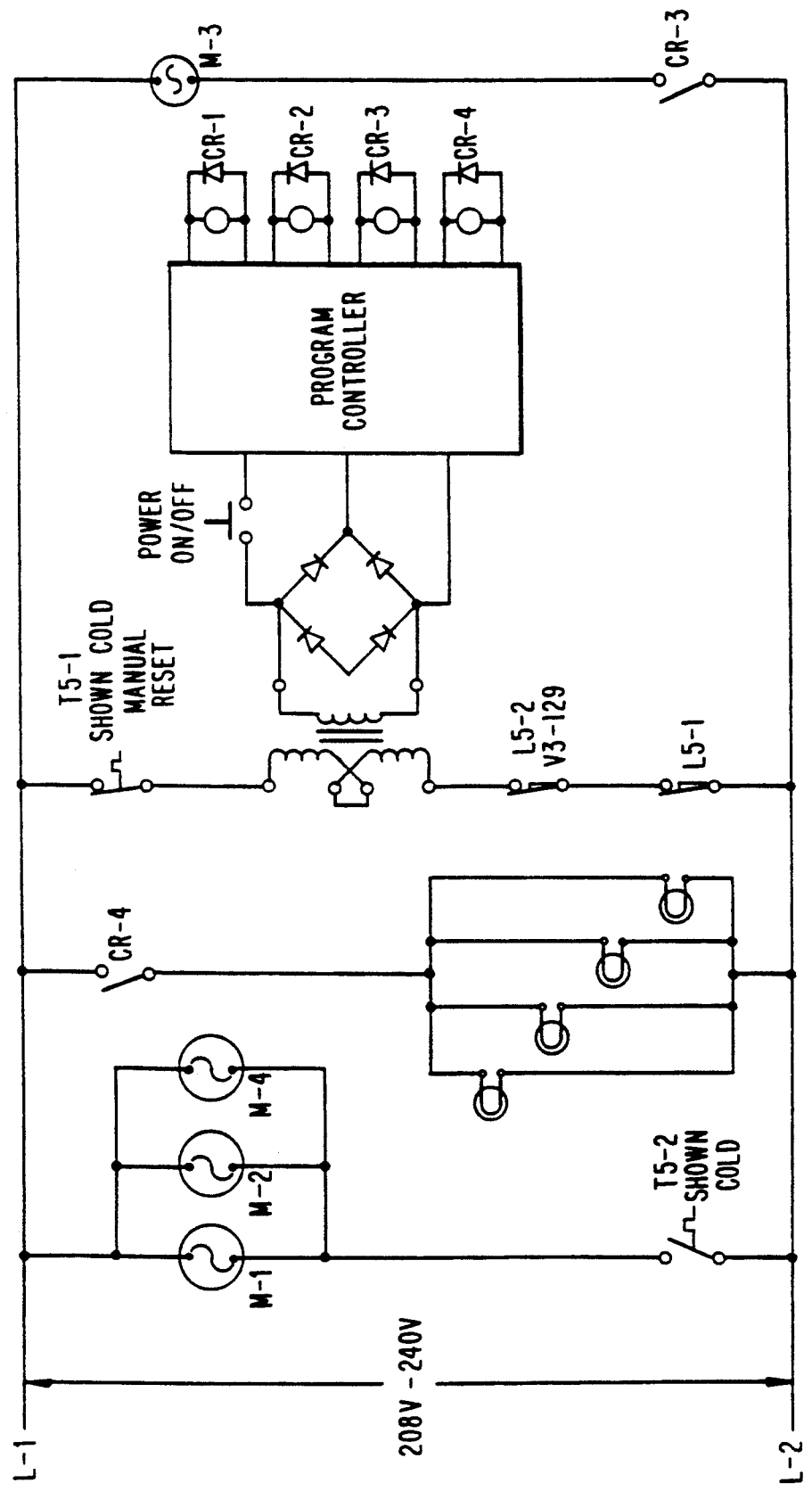
FIG. 6A is a schematic of the control circuit for an embodiment of this invention using an indexing belt feed for a go-stop-go means of travel through the oven of this invention.
Figure 6B:
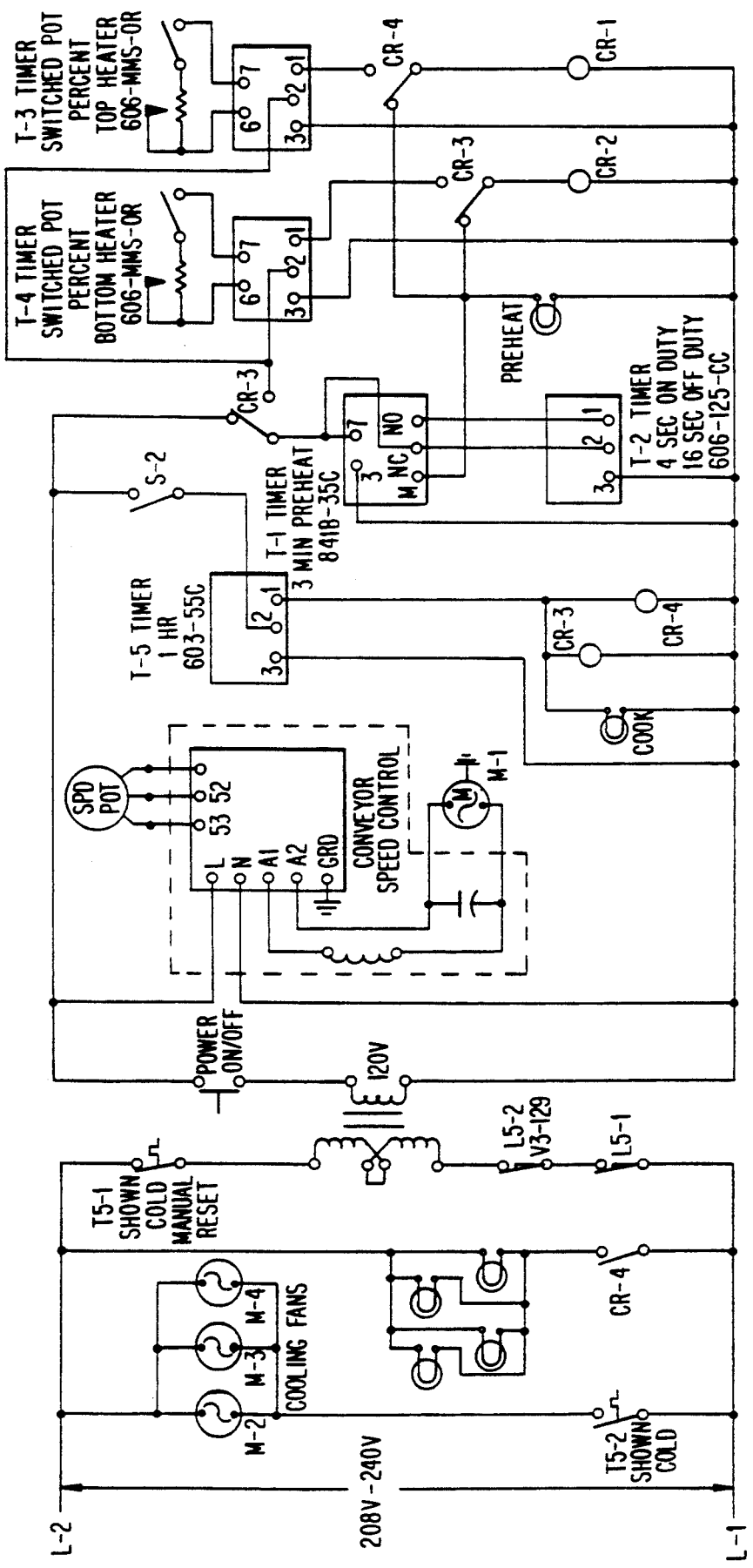
FIG. 6B is a view similar to FIG. 6a only showing the control circuit for a continuous belt feed in an embodiment of this invention.

FIGS. 6A and 6B show, respectively, schematics for the indexing belt feed and a continuous belt feed. In the indexing belt feed, the belt advances the food product into housing 12 and stops with the product located between heating elements 38 and 40. This movement would be identified by optical sensors 44 and the controller signalled accordingly. In the preferred embodiment of this invention, the control is by time rather than temperature and, therefore, after a predetermined period of time, the belt drive would then index the food out of the housing 12 and onto extension 24 whereupon the belt would stop while the food product is removed and another food product placed at the entrance, on the belt portion in extension 22.

In the continuous belt feed, the belt will run continuously at a speed to be determined at the control panel 18 whereby residence time within the housing 12 wherein the heating elements are dispensing infra-red radiation at a predetermined wavelength or within a predetermined wavelength range, the product will be cooked.

As with FIGS. 7A and 7B, FIGS. 6A and 6B are intended to be illustrative and not limitative of this invention. Accordingly, a different type of control circuit or control function is intended to be within the scope of this invention.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. Method for cooking food in a compact, countertop type conveyor oven comprising: providing a housing defining a cooking chamber having an inlet and an outlet; a conveyor belt extending through the chamber and through the inlet and outlet and drive means therefor; support arms mounted on said housing at the inlet and outlet for supporting that portion of said conveyor belt extending therefrom; top and bottom infra-red heating elements mounted within said chamber above and below the upper flight of that portion of the conveyor belt disposed in said chamber each element contained in a plane disposed parallel to the upper flight and spaced a predetermined distance therefrom, said elements substantially covering that portion of the flight disposed within said chamber, said elements being etched foil heaters; and control means coupled to said oven for controlling the speed of travel of the conveyor belt through said chamber and the wavelength of the infra-red radiation generated and time of exposure thereto within the chamber; and passing food to be cooked through said oven on said conveyor while subjecting said food to infra-red radiation generated by said foil heaters at a wavelength between about 4-5 microns while maintaining a surface temperature of less than about 700° F. in said heaters by interrupting the operation of said heaters.

2. The method of claim 1 wherein the heaters have a capacity of about 7-8 watts power per square inch of surface area.

3. The method of claim 1 wherein the conveyor belt provided is only about 18 inches wide.

4. The method of claim 1 wherein said control means in sequence advances said belt into said chamber, stops for a predetermined period of time and then advances said belt again through said chamber so that the food product thereon is indexed into the chamber for a predetermined period of time to cook it and then advance through the outlet so that it can be replaced in the chamber with another food product to be cooked.

5. The method of claim 1 wherein said control means advances said belt continuously at a predetermined speed proportional to the residence time of an incremental portion of said conveyor belt within the cooking chamber.

6. The method of claim 1 wherein the depth of said oven in the direction of said parallel planes is no more than about 24 inches.

7. The method of claim 6 wherein the inlet and outlets have rectangular dimensions of about 3 by 19½ inches.

8. The method of claim 1 further comprising providing an optical indicator means for indicating when a food product is disposed on said conveyor at the inlet to said chamber.

* * * * *